United States Patent [19]
Black et al.

[11] 3,874,971

[45] *Apr. 1, 1975

[54] LAMINATED ARTICLE OF METALLIC, POLYMERIC AND WAX IMPREGNATED CELLULOSIC LAYERS AND METHOD OF PREPARATION

[75] Inventors: Ernest P. Black; Irl N. Duling, both of West Chester; John C. Merges, Jr., Glen Mills; Alfred F. Talbot, Wallingford, all of Pa.

[73] Assignee: Sun Research and Development Co., St. Davids, Pa.

[ * ] Notice: The portion of the term of this patent subsequent to Feb. 13, 1990, has been disclaimed.

[22] Filed: Aug. 31, 1972

[21] Appl. No.: 285,404

Related U.S. Application Data

[63] Continuation-in-part of Ser. No. 61,718, Aug. 6, 1970, Pat. No. 3,716,441.

[52] U.S. Cl. ................. 156/308, 156/313, 156/307, 156/309, 161/214, 161/220, 161/216, 161/218, 161/220, 161/223, 161/235, 264/261
[51] Int. Cl. ............................................. C09j 5/02
[58] Field of Search ........... 161/214, 220, 223, 228, 161/229, 234, 235; 156/61, 228, 235, 285, 307, 309, 311, 313, 326, 308; 264/45, 46, 264/47, 48, 111, 261; 106/38.25, 230, 231

[56] References Cited
UNITED STATES PATENTS

| | | | |
|---|---|---|---|
| 2,341,845 | 2/1944 | Mark et al. | 161/234 |
| 2,610,939 | 9/1952 | Fisher et al. | 156/326 |
| 3,172,801 | 3/1965 | Cantelow | 161/216 |
| 3,553,074 | 1/1971 | Knepp | 161/220 |
| 3,666,618 | 5/1972 | Block | 161/235 |
| 3,689,334 | 9/1972 | Dermody | 156/326 |
| 3,716,441 | 2/1973 | Black et al. | 156/309 |
| 3,717,534 | 2/1973 | Duling et al. | 156/309 |

*Primary Examiner*—George F. Lesmes
*Assistant Examiner*—William R. Dixon, Jr.
*Attorney, Agent, or Firm*—George L. Church; J. Edward Hess; Anthony Potts, Jr.

[57] ABSTRACT

A tri-layer laminated article, having an outer wax impregnated cellulosic layer, a middle thermoplastic polymeric layer and an outer metallic layer, is easily prepared by applying a dispersion of solid polymer particles in molten wax to the surface of at least one of the outer layers and then placing the other outer layer adjacent to the dispersion. After the application of heat and pressure to the resulting composite, the cellulosic layer is impregnated with wax and the polymer is a molten middle layer. The latter upon cooling, solidifies resulting in the metallic layer firmly adhering to the solid polymeric layer which is firmly adhering to the wax impregnated cellulosic layer. The polymer used must be substantially insoluble in the molten wax at a temperature below the melting point of the polymer and have an adhesive capacity for both metallic and cellulosic materials. The resulting article has utility as a packaging material.

9 Claims, 2 Drawing Figures

SECTION "A-A"

LAMINATED ARTICLE OF METALLIC, POLYMERIC AND WAX IMPREGNATED CELLULOSIC LAYERS AND METHOD OF PREPARATION

CROSS-REFERENCES TO RELATED APPLICATIONS

The present application is a continuation-in-part of application Ser. No. 61,718, filed Aug. 6, 1970, by Ernest P. Black, Irl N. Duling, John C. Merges, Jr. and Alfred F. Talbot, entitled "METHOD FOR PREPARING LAMINATED ARTICLE OF METALLIC, POLYMERIC AND WAX IMPREGNATED CELLULOSIC LAYERS" now U.S. Pat. No. 3,716,441, issued Feb. 13, 1973. Also, the present application is copending with the following application Ser. No. 61,719, filed Aug. 6, 1970, by Irl N. Duling and John C. Merges, Jr., entitled "METHOD FOR PREPARING LAMINATED ARTICLE OF CELLULOSIC AND POLYMERIC LAYERS" now U.S. Pat. No. 3,717,534, issued Feb. 20, 1973.

BACKGROUND OF THE INVENTION

The present invention provides a method for preparing a tri-layer laminated article having an outer wax impregnated cellulosic layer, a middle thermoplastic polymeric layer and another outer metallic layer. The polymeric layer contributes to the barrier properties of the finished article and acts as an adhesive. This laminated article has utility as a packing material.

Existing methods for preparing laminated articles required several distinct processing steps and, therefore, these methods are time consuming. One example of such a method is as follows. A cellulosic layer is dipped in a bath of molten wax and allowed to remain until the wax impregnates the cellulosic layer. Then the wax impregnated layer is removed from the bath of molten wax and allowed to cool thereby solidifying the wax. Thereafter a suitable thermoplastic polymer is extruded as a molten coating onto the wax impregnated cellulosic layer. The polymer coating is allowed to cool. The resulting product is a bi-layer laminated article having a polymeric layer and a wax impregnated cellulosic layer. Afterwards a metallic layer is brought into contact with the polymer coating which now has to be heated again to melt the polymer. The subsequent application of pressure and a final cooling results in a tri-layer laminated article.

The present invention provides a simplified method for obtaining the same tri-layer laminated article.

SUMMARY OF THE INVENTION

A tri-layer laminated article can be easily prepared by this invention, said article having an outer metallic layer and a middle thermoplastic polymeric layer and an outer wax impregnated cellulosic layer. In this invention a dispersion of solid polymer particles in molten wax, maintained at a temperature below the melting point of the polymer, is applied as a coating to a surface of either the metallic layer or porous cellulosic layer. The other layer, i.e., the layer to which the dispersion is not applied, is brought into contact with the dispersion. After sufficient time for some of the wax to be absorbed has elapsed, heat and pressure are applied. Alternatively, the dispersion can be applied to both outer layers either simultaneously or at different intervals and then the dispersion coated surfaces brought into contact with each other before heat and pressure are applied. In either alternative substantially all the molten wax is absorbed by the cellulosic layer and heat causes the polymer particles to melt and the pressure causes the melted particles to form a middle molten layer. Upon cooling, the molten polymer solidifies and the tri-layer laminated article is formed.

The thermoplastic polymer, used in the aforementioned invention, is one that is substantially insoluble in molten wax at a temperature below the polymer's melting point and has an adhesive capacity for both cellulosic and metallic materials.

DESCRIPTION

Figure 1:
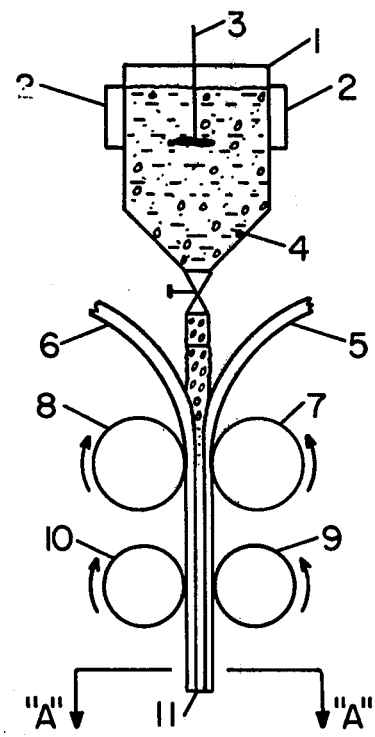
FIG. 1 schematically illustrates one method of forming the tri-layer laminated article in accordance with the invention.

One method of preparing the tri-layer laminated article according to this invention is illustrated in FIG. 1. Thermoplastic polymer particles and solid wax are placed in a suitable container 1. The temperature of the polymer and wax in the container is raised to above the melting point of the wax but below the melting point of the polymer by a suitable heater 2. The temperature of the dispersion is maintained within this range throughout the application step. After the wax melts, sufficient agitation is applied by a conventional mixer 3 to keep the finely divided polymer uniformly distributed throughout the molten wax. The dispersion 4 in the container 1 is transferred, in this illustration, by gravity to between the two outer layers, the cellulosic layer 5 and the metallic layer 6. As the dispersion contacts the cellulosic layer, absorption of the molten wax by the cellulosic layer begins. The dispersion 4, the metallic layer 6 and the cellulosic layer 5 pass between hot rolls 7 and 8. These hot rolls 7 and 8 cause the remaining wax to be rapidly absorbed by the cellulosic stock and the polymer particles to melt while the pressure spreads the molten particles into essentially one continuous layer. Rolls 7 and 8 can be at the same or different temperatures. Afterwards the article is cooled by cold rolls 9 and 10 causing the molten polymer to solidify.

Figure 2:
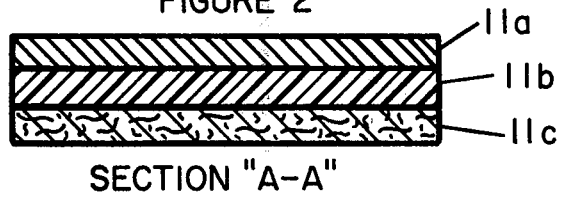
FIG. 2 is a cross-sectional view of the finished laminated product.

FIG. 2 is a cross-sectional view of the finished article 11 prepared by the aforementioned method. The outer layer 11c represents the cellulosic stock 5 now impregnated with wax from the wax polymer dispersion 4. The middle layer 11b is essentially a continuous polymeric layer, the polymer being from the wax-polymer dispersion 4. Because substantially all the wax is absorbed by the cellulosic layer 11C and the polymer is insoluble in the molten wax, the polymeric layer is substantially all polymer. The polymeric layer is continuous in the sense that it contributes to the total barrier property of the finished article even though pinholes might exist. These pinholes are extremely small holes and occur even, for example, when extruding a continuous thermoplastic polymer film. The outer layer 11a represents the metallic layer 6 being firmly bound to the polymeric layer 11b, the polymer being from the wax-polymer dispersion 4.

The aforementioned metallic layer can be a foil prepared from such metals as aluminum, steel, silver, gold, tin, lead or an alloy such as tin-lead. The thickness of the foil can vary widely; usually the thickness of the foil is determined by the desired properties of the laminated article.

In practicing this invention, the cellulosic layer must be able to absorb wax at a reasonable rate. Thus a cellulosic layer coated with or impregnated with a substance which would substantially slow down the wax impregnation rate would be unsatisfactory. Typical wax absorption times for coated and uncoated cellulosic materials are shown in the following Table 1.

TABLE I

Wax Absorption Time of Various Cellulosic Materials

| Material[2] | Thickness mils | Surface Coating | Wax Absorption Time, minutes[1] |
|---|---|---|---|
| Kraft liner board | 8.5 | No | 1 |
| Corrugated board | 10 | do. | 1 |
| Cup board | 14 | do. | 3.5 |
| Chip board | 33 | do. | 0.5 |
| Oil can cardboard | 26 | do. | 0.5 |
| Freezer carton | | | |
| Regular density | 10 | do. | 3 |
| Medium density | 18 | do. | 0.5 |
| Paper plate | 20 | do. | 1.5 |
| Paper plate | 20 | do. | 3 to 4 |
| Oil can carboard | 26 | Yes | 6 to 10 |
| Oil can cardboard | 28 | Yes and printed | 50 to 70 |
| Freezer carton | | | |
| Regular density | 10 | Yes | 35 |
| Medium density | 18 | do. | 20 to 22.5 |
| Bread wrapper | 2.5 | — | >12 |
| Glassine paper | 1.33 | — | >100 |

[1]Time required for a 0.1 ml. drop of wax to be absorbed into a test sheet at 160°F.
[2]These materials are defined in THE DICTIONARY OF PAPER, 3rd Edition, American Paper and Pulp Association, 1965.

The data in Table I indicates that Kraft liner board would be a preferred cellulosic material to be used with this invention whereas a coated material such as medium density freezer carton having a wax absorption time of 20 to 22.5 minutes would be a less preferred cellulosic material.

The cellulosic layer, in addition to absorbing the wax at a reasonable rate, must be able to absorb substantially all the wax applied to its surface. If sufficient wax remains unabsorbed, the strength of the bond between the metallic layer and the middle layer of wax and polymer is weak, depending on how much wax remains unabsorbed. Weak means that the metallic layer can be easily separated from the wax impregnated cellulosic layer. Furthermore, a wax and polymer middle layer would have permeation properties different from just a polymer middle layer. Thus a weak bond and a lack of a middle polymer barrier are avoided by having the cellulosic layer absorbed substantially all the wax.

The pulp used to make the various cellulosic layers that can be used in this invention can be derived from a suitable source such as wood, reclaimed paper, cotton fibers and other fibers such as manila hemp, jute, etc.

The wax used herein can be a petroleum wax obtained by any one of the processes described in Chapter 5 of THE CHEMISTRY AND TECHNOLOGY OF WAXES by A. H. Warth, 2nd Edition and can be any one of the refined or unrefined petroleum waxes described in the same chapter. Synthetic waxes that can be used are described in Chapter 6 of the aforementioned reference.

Petroleum wax is commercially available with a wide range of physical properties. Paraffin waxes are available with melting points from about 126° to 153° F. (ASTM D87), oil contents from about 0.1 to about 1.2% (ASTM D721), penetration at 77° F. from about 9 to 40 (ASTM D1321), specific gravity at 212° F. from about 0.756 to 0.767 (ASTM D287). Microcrystalline waxes are available with melting points from about 151° to 193° F. (ASTM D127), oil contents from about 0.4 to about 1.5% (ASTM D721), and specific gravity at 212° F. from about 0.786 to 0.795 (ASTM D287). While these different petroleum waxes will be absorbed at different rates by various cellulosic stocks, our invention can be used with any petroleum wax fraction that will be absorbed by the stock.

If a thermoplastic polymer which is soluble in molten wax at a temperature below the melting point of the polymer is used with this invention, the following problems arise. First if the polymer is soluble in the molten wax at a temperature below the melting point of the polymer, the viscosity of the resulting combination is drastically increased. This resulting high viscosity combination is very difficult to handle and to apply a layer. Furthermore, on contacting the cellulosic layer, the combination is absorbed by the layer and, therefore, the wax-polymer impregnated cellulosic layer cannot contribute the desired barrier properties of just a wax impregnated cellulosic layer. The remaining combination, after having pressure applied, forms a relatively weak polymer-wax bond between the metallic and cellulosic layers. Finally, the inner layer, being a wax-polymer blend, cannot contribute the desired barrier properties of just polymer. Thus to avoid the heretoforementioned problems, the thermoplastic polymer used with this invention must be substantially insoluble in the molten wax at a temperature below the melting point of the polymer.

Another requirement of the thermoplastic polymer forming the middle layer of the tri-layer laminated article is that it have an adhesive capacity for both the metallic and cellulosic layers. Thus the middle thermoplastic polymeric layer, in addition to contributing to the final barrier performance of the article, acts as an adhesive holding the metallic layer to the wax impregnated cellulosic layer. Normally an adhesive in a laminated article, i.e., the material holding two layers together, does not contribute substantially to the barrier properties of the laminated article. Barrier properties, as used herein, refers to such properties as resistance of the material to the transmission of water vapor, gas and grease. Standard tests exist for measuring these permeability properties. However, in this invention the middle thermoplastic polymeric layer acts as a barrier and an adhesive.

Surprisingly, not all thermoplastic polymers which are insoluble in molten wax at a temperature below the polymer's melting point have an adhesive capacity for both the metallic and cellulosic layers. Adhesive capacity as used herein means that peel strength as determined by a modified TAPPI-T806-SM46 test of the laminated article is greater than zero.

Examples of thermoplastic polymers which are substantially insoluble in the molten wax at a temperature below the melting point of the polymer and have an adhesive capacity for both metallic and cellulosic materials are as follows: polyamide, polyvinyl chloride, cellulose acetate butyrate, polymethylmethacrylate, polyethylene with a molecular weight in excess of 1 million, polycarbonate and polystyrene. Polyamide, polyvinyl chloride, cellulose acetate butyrate and polymethylmethacrylate are the preferred polymers to be used with this invention.

The polyamide can be an aliphatic polyamide such as nylon-3, nylon-4, nylon-6, nylon-7, nylon-8, nylon-9, nylon-10, nylon-11, nylon-12, nylon-6,6, nylon-6,10, as well as copolymers such as nylon 6,6-6,10. Also, the polyamide can be an aliphatic-aromatic polyamide such as nylon-6,T, or an all-aromatic polyamide such as poly (meta-phenylenediamine isophthalamide). The methods of preparing these polyamides as well as their physical and chemical properties are defined in Kirk-Othmer, ENCYCLOPEDIA OF CHEMICAL TECHNOLOGY, Vol. 16, 2nd Edition, page 1, etc.

One example of a thermoplastic polymer which is insoluble in molten wax but does not have the adhesive capacity for both metallic and cellulosic layers is isotactic polypropylene with a molecular weight of 600,000.

The thermoplastic polymer used in this invention, when added to the wax, is in the form of finely divided particles. If the particles are too large, say passing through 3 mesh but remaining on 20 mesh, the resulting dispersion is unstable in that the particles settle out rapidly causing problems during the application of the dispersion to a layer. All references to mesh herein refer to U.S. Sieve Series. Even if this settling problem can be overcome, the resulting polymer coating on the layer is of nonuniform thickness and is not continuous; that is, there are some areas where there is no polymer coating. These areas would be substantially greater than the pinholes mentioned herein. Thus while this invention is operable if all the polymer particles pass through a 20 mesh, it is preferable that all particles pass through 100 mesh and even more preferable that all particles pass through 200 mesh. Particle size distribution also influences dispersion stability and dispersion viscosity. At the same wax-polymer ratios a wide range particle distribution, compared to a narrow range particle distribution, tends to have a greater viscosity and hence greater stability. The limits as to particle size distribution range can be easily determined by those skilled in the art.

The weight ratio of the polymer to the wax used in this invention depends on dispersion stability and dispersion viscosity which in turn depends on polymer particle size and particle size distribution. Satisfactory weight ratios are 5 to 45 parts by weight of finely divided polymer and 55 to 95 parts by weight of wax; the preferred weight ratios are 10 to 40 parts by weight of finely divided polymer and 60 to 90 parts by weight of wax.

The preliminary step in practicing this invention is to prepare the dispersion. Solid wax is placed in a suitable container and heated until the wax becomes molten; but the resulting temperature should not exceed the melting point of the polymer being used. After the wax melts, the polymer is added; mild agitation is usually necessary to form the dispersion. Alternatively, both the solid wax and the polymer particles can be placed in a container and heated together to a temperature below the polymer's melting point. Immediately after the dispersion has been prepared it can be used or it can be cooled and the resulting solid used at a later time. The permissible temperature range used to prepar the dispersion depends on the melting point of the specific wax being used and the melting point of the specific polymer being used.

The dispersion, consisting of molten wax and polymer particles, is applied to an outer layer in one of several ways. One method has already been discussed in connection with FIG. 1. Another method is that the dispersion is applied to the inner surface of a moving horizontal cellulosic layer. The application of a uniformly thick layer of dispersion to the layer can be obtained by using a doctor blade, or by extruding (curtain coating), or by a roll coater or some other suitable equipment.

As soon as the dispersion touches the cellulosic material, the latter starts to absorb the wax. The interval of time during which this absorption occurs before the metallic layer is placed adjacent to the dispersion depends on the equipment used, the wax absorption rate of the layer and the amount of wax applied per surface area of cellulosic layer. This interval of time can range from a fraction of a second to many minutes. An example of the former is as follows. An extruded dispersion film, containing a relatively small percentage of wax, contacts the cellulosic material and immediately thereafter the metallic layer is placed adjacent to the dispersion film. Almost simultaneously the resulting composite comes into contact with heated rollers. These heated rollers raise the temperature of the polymer particles to above the fusion point of the polymer and apply the desired pressure to the molten polymer particles. Thus much of the wax absorption by the cellulosic material may occur after the metallic layer is placed adjacent to the dispersion.

Alternatively, an example of where the time interval is relatively large is as follows. The dispersion, containing a relatively large percentage of wax, is applied to the cellulosic material but the metallic layer is not brought adjacent to the dispersion until substantially all the wax is absorbed by the cellulosic layer. During this long intervening period, the temperature of the dispersion must be above the melting point of the wax but below the melting point of the polymer. A minor amount of wax can remain unabsorbed so that the polymer particles remain evenly distributed on the stock during movement of the cellulosic layer.

In the aforementioned examples, the dispersion is first applied to the cellulosic layer and then the metallic layer is brought adjacent to the dispersion. The converse is also operable without changing the properties of the resulting article. That is to say, the dispersion can be applied first to the metallic layer and subsequently the cellulosic layer brought adjacent to the dispersion without affecting the properties of the resulting article. However, the former method is preferred.

After the dispersion has been coated on one layer and the other layer brought adjacent thereto, the coating is heated and the outer layers are pressed against the coating to cause the melted polymer particles to form the desired essentially continuous middle polymer barrier and adhesive. The application of this heat to raise the temperature of the dispersion can precede the application of the pressure by some finite time interval or can be simultaneous with the pressure. Application of heat to the metallic layer is preferred since it conducts heat more readily than the cellulosic layer. The amount of pressure applied depends on the type of polymer and ability of the layers, particularly the cellulosic ones, to withstand the applied pressure without undesirable deformation. During this heat and pressure step, any wax remaining unabsorbed is absorbed by the cellulosic material.

Another alternative method is as follows. After the dispersion is applied to the cellulosic layer and sufficient time has elapsed so that substantially all of the wax is absorbed, the polymer particles are raised to a temperature above their melting point of radiation and then the metallic layer is placed adjacent to the molten particles. After the metallic layer is in place pressure is applied. In this alternative or any of the other alternatives defined herein, the metallic layer, prior to being placed adjacent to the dispersion, can be at a temperature greater than ambient temperature. However, the maximum temperature of the metallic layer prior to being placed adjacent to the dispersion would be just below the decomposition temperature of the polymer.

Subsequently, the composite can be allowed to cool or can be cooled by suitable heat removal device. Cold rollers are one example of the latter.

ond place to facilitate handling. The resulting assembly was placed between the platens of a press. The platen to be brought into immediate contact with the back side of the polished plate was preheated to a temperature sufficient to fuse the specific polymer. The platens were closed loosely for a few seconds to heat the polished plate and the polymer particles. The pressure was then raised about 500 p.s.i. and maintained for a short time (about 10 sec.). The pressure was released, and the assembly was removed from the press and cooled to about room temperature. The resulting product was a tri-layer laminated article having an outer aluminum foil layer, an essentially continuous middle polymer layer of a thickness of about 0.001 inch and an outer wax impregnated cup board. The aluminum foil adhered firmly to the polymer as indicated by the peel strength data shown in Table II.

TABLE II

Polymers and Temperatures Used to Prepare Laminated Articles:
Aluminum Foil [c]-Polymer-Wax Impregnated Cup Board [d]

| Run | Polymer | Melting Point of Polymer-°F. | Fusion Temp.-°F. | Peel Strength [f] lbs/3" width |
|---|---|---|---|---|
| 1 | nylon-11 | 376 | 410 | 3.45 |
| 2 | nylon-6,6 | 500 | 520 | 1.38 |
| 3 | nylon-6,10 | 410 | 430 | 1.06 |
| 4 | nylon-12 | 347–356 | 430 | 0.30 |
| 5 | nylon-6 | 425 | 430 | 0.18 |
| 6 | polyvinyl-chloride | 300 | 325 | 0.50 |
| 7 | cellulose acetate butyrate [e] | 265 | 330 | 0.30 |
| 8 | polymethylmethacrylate | 390 | 400 | 0.20 |
| 9 | polyethylene [a] | 285 | 310 | 0.1 |
| 10 | polystyrene [b] | 250 | 310 | 0.1 |

[a] Molecular weight of 3,000,000
[b] Medium impact
[c] One mill thickness
[d] Properties of cup board: 14 mils, 62 lbs. per 1000 sq. ft.
[e] Contains 13 wt.% acetyl groups & 37 wt.% butyl groups
[f] Modified TAPPI-T806-SM 46, dry test on 3" wide specimen at rate of 2"/min. and foil being pulled at 180°.

The following examples illustrate this invention:

Examples I–X

Seventy-five parts of petroleum wax were placed in a suitable container and the temperature of the wax was raised to above its melting point but below the melting point of the polymer to be added. To the molten wax 25 parts of the polymer were added. Gentle agitation maintained the polymer particles uniformly distributed in the wax. This dispersion was applied to a cup board stock in the following manner. An oven was maintained at 160° F. In this oven was a roll of cellulosic material, i.e., cup board and several inches away was a doctor blade set to apply 2 to 5 mils of dispersion. The cup board moved from the mounted roll under the doctor blade and out of the oven. The molten wax-polymer dispersion was applied to the cup board between the roll and the doctor blade. Thus as the cup board traveled under the doctor blade a predetermined thickness of dispersion was applied. Note that the thickness must be limited to lay down no more wax component than can be absorbed by the cup board. In these examples as the cup board left the oven much of the wax was absorbed by the cup board because of the slowness at which it moved.

Aluminum foil was placed on the coated surface of the cup board. Against this foil was placed a mirror-finish plate (ferrotype) which was backed with a sec- Use of either the bright smooth side or the dull rough side of the aluminum foil to contact the dispersion gave equivalent results.

For comparative purposes a tri-layer article of aluminum foil-wax-wax impregnated cup stock was prepared in an analogous manner. The peel strength of this tri-layer article was zero. Also, for comparative purposes a tri-layer laminated article of aluminum foil-nylon-11-porous cup stock was prepared in an analogous manner. The peel strength of this article was a tear seal, i.e., rather than the foil separating through the polymeric layer from the cup stock and the cup stock itself was torn. However, this latter article does not have any of the desired barrier properties.

An unsuccessful tri-layer article of aluminum foil-isotactic polypropylene with a molecular weight of about 600,000 wax impregnated cup stock was prepared in a similar fashion to that described for runs 1 to 10. The article was unsuccessful in that the peel strength was zero.

Example XI

Using steel foil in place of aluminum foil, a laminated article of steel foil-nylon-11-wax impregnated cup board was made in a similar fashion to that described for Examples I–X. This laminated article had a tear seal.

The petroleum wax used in Examples I to IX had the following inspections:

| | | |
|---|---|---|
| Melting point, ASTM D87 | | 126°F. |
| Oil Content, ASTM D721 | | 0.4 |
| Color, Saybolt, ASTM D156 | | +29 |
| Penetration at 77°F., ASTM D1321 | | 18 |
| Viscosity, SUS at 210°F., | ASTM D446 | 38.8 |
| Specific gravity at 212°F., | ASTM D287 | 0.760 |

Use of other metallic materials, i.e., tin, lead silver, gold and tin-lead, with the polymers listed in Table II, as well as other polyamides, will result in a tri-layer laminated article in which the metallic layer is firmly adhering to the polymeric layer.

The invention claimed is:

1. Method of preparing a tri-layer laminated article, having an outer wax-impregnated cellulosic layer, a middle thermoplastic polymeric layer and an outer metallic layer, comprising:
    a. establishing a heterogeneous composite of thermoplastic polymer in finely divided form and molten wax, said polymer having an adhesive capacity for both metallic and cellulosic materials and a melting point above the melting point of the wax and being substantially insoluble in molten wax at a temperature below the melting point of the polymer;
    b. applying a coating of said heterogeneous composite to an inner surface of an outer metallic layer at a temperature above the melting point of wax but below the melting point of the polymer, the amount of coating being regulated so that substantially all of the wax therein is absorbable in the cellulosic layer;
    c. placing the other outer cellulosic layer adjacent said coating and allowing sufficient time to permit the wax to start to absorb into said cellulosic layer and then;
    d. heating the coating to a temperature above the melting point of the polymer and pressing the outer layers against the coating to form an essentially continuous molten polymer layer between the metallic layer and cellulosic layer;
    e. and thereafter cooling the molten polymer whereby it solidifies resulting in said article.

2. A method according to claim 1 wherein said heterogeneous composite contains 5 to 45 parts by weight of finely divided polymer and 55 to 95 parts by weight of said wax.

3. A method according to claim 2 wherein all the finely divided polymer is finer than 100 mesh (U.S. Sieve Series).

4. A method according to claim 3 wherein the polymer is selected from the following group: polyamide, polyvinylchloride, cellulose acetate butyrate, polymethylmethacrylate, polyethylene with a molecular weight in excess of 1 million, polycarbonate and polystyrene.

5. A method according to claim 4 wherein the metallic layer is selected from the following group: aluminum, steel, tin, lead, silver, gold and tin-lead alloy.

6. A method according to claim 5 wherein the polymer is selected from the following group: polyamide, polyvinylchloride, cellulose acetate butyrate and polymethylmethacrylate.

7. A method according to claim 1 wherein the wax is a petroleum wax.

8. A method according to claim 7 wherein the polymer is selected from the following group: polyamide, polyvinylchloride, cellulose acetate butyrate and polymethylmethacrylate.

9. A method according to claim 8 wherein said heterogeneous composite contains 10 to 40 parts by weight of finely divided polymer and 60 to 90 parts by weight of said wax, all the finely divided polymer is finer than 100 mesh (U.S. Sieve Series), said polymer is selected from the following group: nylon-11 nylon-6,6, nylon-6,10, and said metallic layer is selected from the following group: aluminum and steel.

* * * * *